(12) United States Patent
Sohn et al.

(10) Patent No.: US 10,170,732 B2
(45) Date of Patent: Jan. 1, 2019

(54) FLEXIBLE SECONDARY BATTERY

(71) Applicant: SAMSUNG SDI CO., LTD., Yongin-si, Gyeonggi-do (KR)

(72) Inventors: Juhee Sohn, Yongin-si (KR); Junwon Suh, Yongin-si (KR); Jeong-Doo Yi, Yongin-si (KR); Hyunhwa Song, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 519 days.

(21) Appl. No.: 14/695,772

(22) Filed: Apr. 24, 2015

(65) Prior Publication Data

US 2016/0020437 A1 Jan. 21, 2016

(30) Foreign Application Priority Data

Jul. 16, 2014 (KR) .................. 10-2014-0089892

(51) Int. Cl.
*H01M 6/00* (2006.01)
*H01M 2/02* (2006.01)
*H01M 2/08* (2006.01)

(52) U.S. Cl.
CPC ....... *H01M 2/0275* (2013.01); *H01M 2/0207* (2013.01); *H01M 2/08* (2013.01); *H01M 2220/30* (2013.01)

(58) Field of Classification Search
CPC .... H01M 2/0275; H01M 2/0207; H01M 2/08; H01M 2220/30
See application file for complete search history.

(56) References Cited

U.S. PATENT DOCUMENTS

| 2007/0117008 | A1  | 5/2007 | Kaneko et al. |
| 2009/0169991 | A1* | 7/2009 | Yeh .................. H01M 2/06 429/185 |
| 2012/0058378 | A1* | 3/2012 | Lee .................. B32B 27/08 429/127 |
| 2012/0202105 | A1  | 8/2012 | Shinyashiki et al. |
| 2014/0079979 | A1* | 3/2014 | Kwon .............. H01M 2/08 429/127 |

FOREIGN PATENT DOCUMENTS

| JP | 2012-164470 A | 8/2012 |
| KR | 10-2007-0053614 A | 5/2007 |
| KR | 10-20140035689 A | 3/2014 |

* cited by examiner

*Primary Examiner* — Raymond Alejandro
(74) *Attorney, Agent, or Firm* — Lee & Morse, P.C.

(57) ABSTRACT

A flexible secondary battery including an electrode assembly that includes a first electrode layer, a second electrode layer, and a separator between the first and second electrode layers; a protection film on at least one of an upper surface or a lower surface of the electrode assembly; a fixing unit, the fixing unit fixing one end portion of each of the first electrode layer, the separator, the second electrode layer, and the protection film; and a sealing unit, the sealing unit sealing the electrode assembly and the protection film therein, wherein a melting point of the protection film is higher than a melting point of the separator.

11 Claims, 4 Drawing Sheets

FLEXIBLE SECONDARY BATTERY

CROSS-REFERENCE TO RELATED APPLICATION

Korean Patent Application No. 10-2014-0089892, filed on Jul. 16, 2014, in the Korean Intellectual Property Office, and entitled: "Flexible Secondary Battery," is incorporated by reference herein in its entirety.

BACKGROUND

1. Field

Embodiments relate to a flexible secondary battery.

2. Description of the Related Art

Due to the development of electronic technology, the markets for various mobile electronic devices, such as mobile phones, game machines, portable multimedia players (PMPs), MP3 players, smart phones, smart pads, e-book terminals, flexible tablet computers, and mobile medical devices attached to human bodies, are growing at a remarkable rate.

SUMMARY

Embodiments are directed to a flexible secondary battery.

The embodiments may be realized by providing a flexible secondary battery including an electrode assembly that includes a first electrode layer, a second electrode layer, and a separator between the first and second electrode layers; a protection film on at least one of an upper surface or a lower surface of the electrode assembly; a fixing unit, the fixing unit fixing one end portion of each of the first electrode layer, the separator, the second electrode layer, and the protection film; and a sealing unit, the sealing unit sealing the electrode assembly and the protection film therein, wherein a melting point of the protection film is higher than a melting point of the separator.

The protection film may include at least one of polytetrafluoroethylene, thermoplastic polyimide, polyphthalamide, polyethersulfone, polyphenylene sulfide, polyetherimide, or polyether ether ketone.

The protection film may include a material having a melting point of about 150° C. or higher.

The protection film may have a friction coefficient of 1.0 or less.

The protection film may cover a side surface of the electrode assembly.

The flexible secondary battery may further include a first electrode tab and a second electrode tab, wherein the first electrode layer includes a first metal current collector, a first active material area formed by coating the first metal current collector with a first active material, and a first uncoated area that is not coated with the first active material, the first electrode tab being attached to the first uncoated area, and the second electrode layer includes a second metal current collector, a second active material area formed by coating the second metal current collector with a second active material, and a second uncoated area that is not coated with the second active material, the second electrode tab being attached to the second uncoated area.

The sealing unit may include a flexible gasket surrounding edges of the electrode assembly; a first sealing sheet on a first surface of the flexible gasket; and a second sealing sheet on a second surface of the flexible gasket, the second surface being opposite to the first surface.

A thickness of the flexible gasket may be about 80% to about 120% of a thickness of the electrode assembly.

Each of the first sealing sheet and the second sealing sheet may include a first insulating layer, a metal layer, and a second insulating layer, each first insulating layer may contact the gasket, and the flexible gasket and each first insulating layer may be formed of a same material.

The flexible secondary battery may further include a first lead electrode and a second lead electrode that pass through one side of the flexible gasket.

The first lead electrode may contact the first electrode tab in an interior of the flexible gasket, and the second lead electrode may contact the second electrode tab in the interior of the flexible gasket.

The sealing unit may include a first sealing unit that includes an accommodation hole, the accommodation hole accommodating the electrode assembly therein; and a second sealing unit that covers the accommodation hole and that is attached to the first sealing unit at an edge of the accommodation hole, wherein the first and second electrode tabs extend from an inside of the sealing unit to an outside of the sealing unit by passing between the first and second sealing units.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
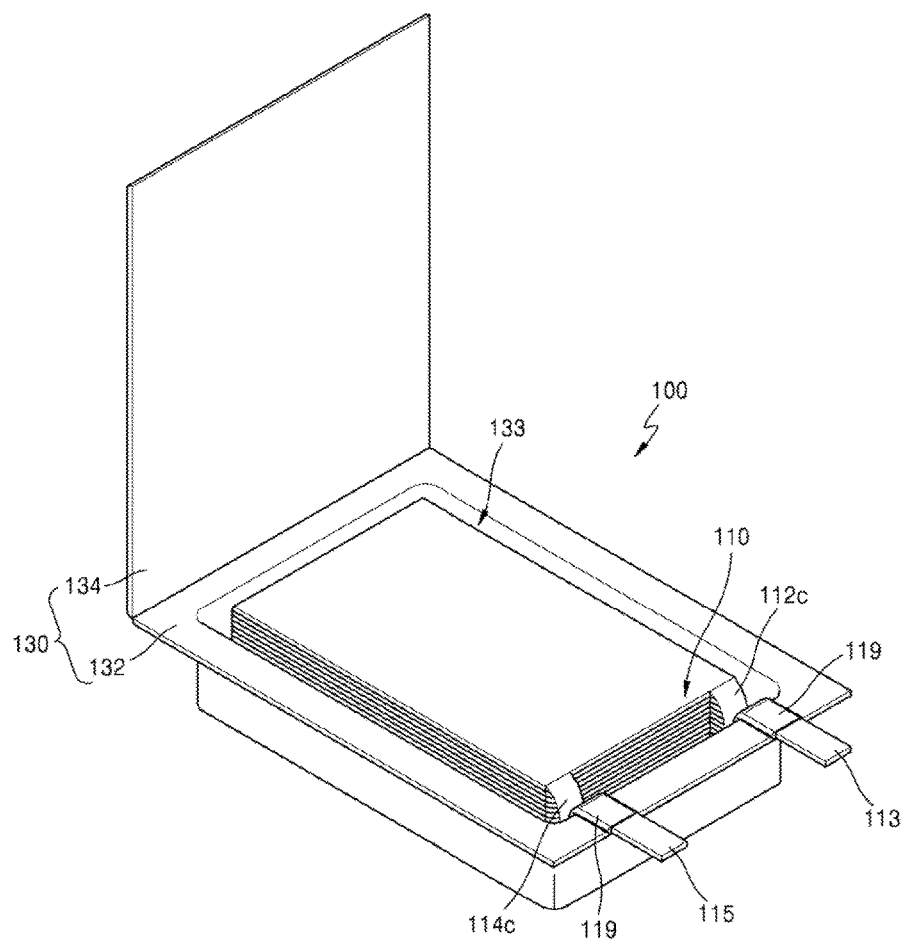
FIG. 1 illustrates an exploded perspective view of a flexible secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "includes", "including", "comprises", and/or "comprising" used herein specify the presence of stated features or components, but do not preclude the presence or addition of one or more other features or components.

It will be understood that when a layer, region, or component is referred to as being "formed on," another layer, region, or component, it can be directly or indirectly formed on the other layer, region, or component. For example, intervening layers, regions, or components may be present.

Figure 2:
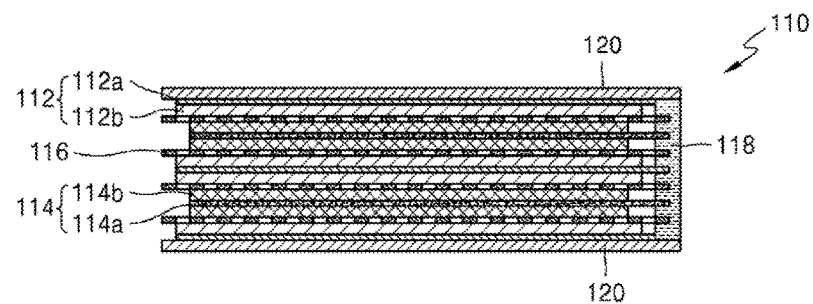
FIG. 2 illustrates a cross-sectional view of an electrode assembly of the flexible secondary battery of FIG. 1.

FIG. 1 illustrates an exploded perspective view of a flexible secondary battery 100, according to an embodiment. FIG. 2 illustrates a cross-sectional view of an electrode assembly 110 of the flexible secondary battery of FIG. 1.

Referring FIGS. 1 and 2, the flexible secondary battery 100 according to an embodiment may include the electrode assembly 110, a protection film 120 on at least one of an upper surface or a lower surface of (e.g., at least one outer surface of) the electrode assembly 110, and a sealing unit 130 sealing the electrode assembly 110 and the protection film 120 therein.

The electrode assembly 110 may include a first electrode layer 112, a second electrode layer 114, and a separator 116 between the first and second electrode layers 112 and 114. For example, the electrode assembly 110 may have a stacked structure formed by repeatedly stacking a plurality of first electrode layers 112, separators 116, and second electrode layers 114.

The first electrode layer 112 may be a positive film or a negative film. If the first electrode layer 112 is a positive film, the second electrode layer 114 may be a negative film, and vice versa.

The first electrode layer 112 may include a first metal current collector 112a, a first active material area 112b (formed by coating the first metal current collector 112a with a first active material), and a first uncoated area 112c (that is an area of the first metal current collector 112a not coated with the first active material). Likewise, the second electrode layer 114 may include a second metal current collector 114a, a second active material area 114b (formed by coating the second metal current collector 114a with a second active material), and a second uncoated area 114c (that is an area of the second metal current collector 114a not coated with the second active material).

If the first electrode layer 112 is a positive film, the first metal current collector 112a may be a positive current collector and the first active material area 112b may be a positive active material area. Also, if the second electrode layer 114 is a negative film, the second metal current collector 114a may be a negative current collector and the second active material area 114b may be a negative active material area.

The positive current collector may include, e.g., aluminum, stainless steel, titanium, silver, or a combination thereof. The positive active material area may include, e.g., a positive active material, a binder, and a conducting agent.

The positive active material may allow reversible intercalation and discharge of lithium ions. In an implementation, the positive active material may include, e.g., lithium transition metal oxides, such as lithium cobalt oxide, lithium nickel oxide, lithium nickel cobalt oxide, lithium nickel cobalt aluminum oxide, lithium nickel cobalt manganese oxide, lithium manganese oxide, and lithium iron phosphate, nickel sulfide, copper sulfide, sulfur, iron oxide, and vanadium oxide.

The binder may include, e.g., a polyvinylidene fluoride-based binder, such as polyvinylidene fluoride, vinylidene fluoride/hexafluoropropylene co-polymer, and vinylidene fluoride/tetrafluoroethylene copolymer, a carboxymethyl cellulose-based binder, such as sodium-carboxymethyl cellulose and lithium-carboxymethyl cellulose, an acrylate-based binder, such as polyacrylic acid, lithium-polyacrylic acid, acryl, polyacrylonitrile, polymethyl methacrylate, or polybutylacrylate, polyamideimide, polytetrafluoroethylene, polyethylene oxide, polypyrrole, lithium-nafion, or styrene butadiene rubber-based polymer.

The conducting agent may include, e.g., a carbon-based conducting agent, such as carbon black, carbon fiber, and graphite, conductive fiber such as metal fiber, metal power such as carbon fluoride powder, aluminum powder, and nickel powder, conductive whisker such as zinc oxide and potassium titanate, a conductive metal oxide such as titanium oxide, or a conductive polymer such as polyphenylene derivatives.

The negative current collector may include, e.g., copper, stainless steel, nickel, or titanium. The negative active material area may include, e.g., a negative active material, a binder, and a conducting agent.

The negative active material may be formed of a material that may form an alloy with lithium or a material that allows reversible intercalation and discharge of lithium. In an implementation, the negative active material may include, e.g., a metal or metalloid, a carbon-based material, a metal oxide, or a lithium metal nitride.

The metal or metalloid may include, e.g., lithium, silicon, magnesium, calcium, aluminum, germanium, tin, lead, arsenic, antimony, bismuth, silver, gold, zinc, cadmium, mercury, copper, iron, nickel, cobalt, or indium.

The carbon-based material may include, e.g., graphite, graphite carbon fiber, coke, mesocarbon microbeads (MCMB), polyacene, pitch-based carbon fiber, or hard carbon.

The metal oxide may include, e.g., lithium titanium oxide, titanium oxide, molybdenum oxide, niobium oxide, iron oxide, tungsten oxide, tin oxide, amorphous tin oxide composite, silicon monoxide, cobalt oxide, or nickel oxide.

The binder and the conducting agent may be the same as those included in the positive active material area.

The separator 116 may be a porous polymer layer that includes, e.g., polyethylene (PE), polystyrene (PS), or polypropylene (PP). For example, the separator 116 may be manufactured by coating polyvinylidene fluoride-hexafluoropropylene (PVDF-HFP) co-polymer on a substrate including, e.g., PE, PS, PP, and a co-polymer of PE, or PP. In an implementation, the separator 116 may be formed to be larger than the first and second electrode layers 112 and 114 to help reduce the probability of and/or prevent a short circuit between the first and second electrode layers 112 and 114.

A first electrode tab 113 and a second electrode tab 115 may be attached to the electrode assembly 110. For example, the first and second electrode tabs 113 and 115 may be respectively attached to a plurality of stacked first and second uncoated areas 112c and 114c by welding.

The electrode assembly 110 may further include a fixing unit 118 that fixes one end of the first electrode layer 112, one end of the separator 116, and one end of the second electrode layer 114 to each other. For example, the one end of the first electrode layer 112, the one end of the separator 116, and the one end of the second electrode layer 114 may overlie or be aligned with one another. The fixing unit 118 may be, e.g., an adhesive or an adhesive tape and may be or extend between the first uncoated area 112c and the separator 116 and between the separator 116 and the second uncoated area 114c.

The fixing unit 118 may only fix one end of the first electrode layer 112, one end of the separator 116, and one end of the second electrode layer 114 to each other. For example, in an area where the fixing unit 118 is not formed, the electrode assembly 110 may bend or may be bendable due to slippage between the first electrode layer 112, the separator 116, and the second electrode layer 114. Even when the electrode assembly 110 is repeatedly bent, relative locations of the first electrode layer 112, the separator 116, and the second electrode layer 114 may be maintained by the fixing unit 118 (e.g., at the one end of the electrode assembly 110).

In an implementation, based on a lengthwise direction of the electrode assembly 110, the fixing unit 118 may be formed or provided at a side of the electrode assembly 110 that is the same as a side at which the first and second electrode tabs 113 and 115 are disposed or protrude.

When the electrode assembly 110 is bent, relative locations of one end of the first electrode layer 112, one end of the separator 116, and one end of the second electrode layer 114 (e.g., overlying ends where the fixing unit 118 is not formed) may change more than relative locations of another end of the first electrode layer 112, another end of the separator 116, and another end of the second electrode layer 114 (e.g., overlying or aligned ends where the fixing unit 118 is formed and that are opposite to the one ends). The first and second electrode tabs 113 and 115 may be respectively attached to a plurality of first uncoated areas 112c and a plurality of second uncoated areas 114c, and the first and second electrode tabs 113 and 115 may function as fixing units that substantially fix the first electrode layers 112 and the second electrode layers 114, respectively.

Accordingly, based on a lengthwise direction of the electrode assembly 110, if the fixing unit 118 were to be formed or provided at a side of the electrode assembly 110 that is opposite to the side where the first and second electrode tabs 113 and 115 are formed or provided, the first electrode layer 112 and/or the second electrode layer 114 could internally bend between the first and second electrode tabs 113 and 115 and the fixing unit 118 when the electrode assembly 110 is bent. Thus, a portion of the fixing unit 118 could be damaged, and an arrangement between the first electrode layer 112, the separator 116, and the second electrode layer 114 could be difficult to be maintained.

The protection film 120 may be disposed on at least one of the upper or lower surface of the electrode assembly 110, and may be fixed to one end of the electrode assembly 110 by the fixing unit 118. For example, the protection film 120 may be on and/or parallel with at least one wide, flat, outer surface of the electrode assembly 110.

The protection film 120 may be between the sealing unit 130 and the electrode assembly 110, and may facilitate smooth slipping between the electrode assembly 110 and the sealing unit 130 when the flexible secondary battery 100 is bent. Therefore, a bending property of the flexible secondary battery 100 may be improved. In an implementation, the protection film 120 may be formed from a material having excellent durability and/or a low coefficient of friction. For example, a surface of the protection film 120 may be smoothly finished to have a friction coefficient of 1.0 or less.

In an implementation, if the first electrode layer 112 or the second electrode layer 114 were to be at or on an outermost area or side of the electrode assembly 110, an active material may not be coated at an outer side of the first metal current collector 112a or an outer side of the second metal current collector 114a. In this case, both ends of the first electrode layer 112 or both ends of the second electrode layer 114 could be rolled toward the outside such that a surface of the first electrode layer 112 or a surface of the first electrode layer 114 where the active material is not coated has a concave shape.

However, when the protection film 120 is on or at the surface, e.g., outer surface, of the first electrode layer 112 or the surface, e.g., outer surface, of the first electrode layer 114 where the active material is not coated, the first electrode layer 112 or the second electrode layer 114 may be prevented from being rolled even when the outer side of the first metal current collector 112a or the outer side of the second metal current collector 114a is not coated with the active material.

In an implementation, the sealing unit 130 (that seals the electrode assembly 110) may include a first sealing unit 132 and a second sealing unit 134. The first sealing unit 132 and the second sealing unit 134 may be attached by using thermal bonding along an edge of the electrode assembly 110 and may thus seal the electrode assembly 110 therein. When heat is applied during the thermal bonding of the first and second sealing units 132 and 134, the separator 116 could shrink, and a short circuit could occur between the first and second electrode layers 112 and 114.

However, if the protection film 120 is disposed at or on an outer side of the electrode assembly 110, shrinking of the separator 116 due to the heat may be reduced and/or prevented. In an implementation, the protection film 120 may be formed of a material having an excellent thermal insulation properties and a higher melting point than that of the separator 116. For example, a melting point of the protection film 120 may be about 150° C. or higher.

In an implementation, the protection film 120 may include, e.g., polytetrafluoroethylene, thermoplastic polyimide, polyphthalamide, polyethersulfone, polyphenylene sulfide, polyetherimide, or polyetherether ketone.

In an implementation, a size or area of the protection film 120 may be the same as or greater than a size or area of the separator 116. The protection film 120 may have a thickness of about 15 µm to about 1 mm such that the protection film 120 has certain degrees of rigidity and flexibility that do not greatly affect the bending of the electrode assembly 110. In an implementation, the protection film 120 may cover, e.g., completely cover, a side of the electrode assembly 110.

An electrolyte may be accommodated in the sealing unit 130 with the electrode assembly 110. The sealing unit 130 may include the first sealing unit 132 (including an accommodation hole 133 that accommodates the electrode assembly 110) and the second sealing unit 134 (that covers the accommodation hole 133 and that is attached to the first sealing unit 132 at an edge of the accommodation hole 133).

The first and second sealing units 132 and 134 may each include a first insulating layer, a metal layer, and a second insulating layer that are sequentially stacked. The first and second insulating layers may be formed of or include, e.g., PP, polyethylene terephthalate (PET), nylon, or the like, and the metal layer may be formed of or may include, e.g., aluminum, steel, stainless steel, or the like. In an implementation, the first and second sealing units 132 and 134 may be formed as a 3-layer structure in which the first insulating layer is formed of PP, the metal layer is formed of aluminum, and the second insulating layer is formed of PET.

One side of the first sealing unit 132 may be connected to one side of the second sealing unit 134. When the electrode assembly 110 is disposed in the accommodation hole 133, the second sealing unit 134 may be bent and disposed above the first sealing unit 132. Then, the first and second sealing units 132 and 134 may be thermally bonded to each other at an edge of the accommodation hole 133 to thus seal the electrode assembly 110 therein.

The first and second electrode tabs 113 and 115 may be withdrawn toward the outside or may penetrate or pass through the sealing unit 130 by passing between the first and second sealing units 132 and 134 that are attached to each other. In order to help improve adhesion strength between the first and second sealing units 132 and 134 and to help prevent a short circuit between the first and second electrode tabs 113 and 115, an insulating tape 119 may be attached to external sides of the first and second electrode tabs 113 and 115.

Figure 3:
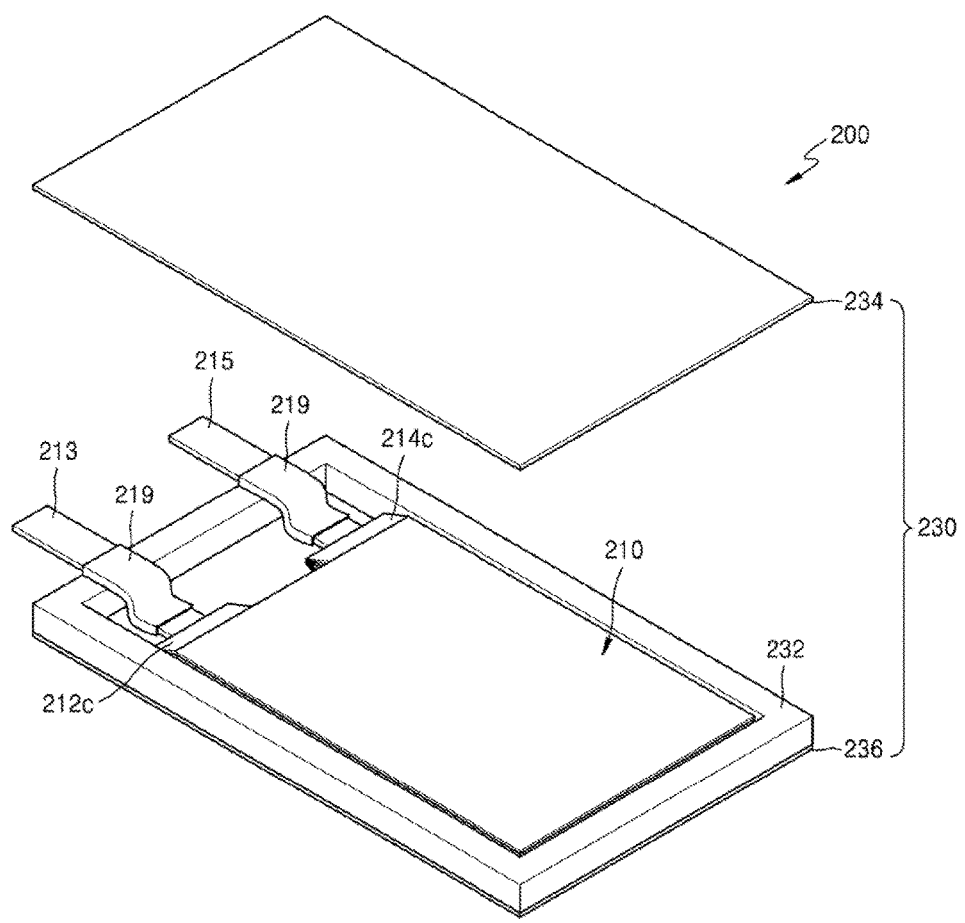
FIG. 3 illustrates an exploded perspective view of a flexible secondary battery according to another embodiment.

FIG. 3 illustrates an exploded perspective view of a flexible secondary battery 200 according to another embodiment.

Referring to FIG. 3, the flexible secondary battery 200 may include an electrode assembly 210 and a sealing unit 230 that seals the electrode assembly 210.

The electrode assembly 210 is the same as the electrode assembly 110 illustrated in and described with reference to FIGS. 1 and 2, and a repeated detailed description thereof may be omitted. Although not illustrated in FIG. 3, a protection film (not shown) may be disposed on at least one of an upper surface or a lower surface of the electrode assembly 210. Therefore, a bending property of the flexible secondary battery 200 may be improved, and shrinkage of a separator due to heat applied when thermally bonding the sealing unit 230 to seal the electrode assembly 210 may be prevented. The protection film may cover, e.g., completely cover, side surfaces of the electrode assembly 210.

The sealing unit 230 may include a gasket 232 (that surrounds edges of the electrode assembly 210), a first sealing sheet 234 (attached to a first surface of the gasket 232), and a second sealing sheet 236 (attached to a second surface of the gasket 232 that is opposite to the first surface).

The gasket 232 may have an opening in the center thereof, may provide a space in which the electrode assembly 210 may be disposed, and may be formed of or include a flexible material. Then, the gasket 232 may bend together with the electrode assembly 210 when the flexible secondary battery 200 is bent. Thus, the gasket 232 may help prevent damage to the electrode assembly 210 (caused by stress concentration) by evenly distributing stress generated when the flexible secondary battery 200 is bent.

The first and second sealing sheets 234 and 236 may each include a first insulating layer, a metal layer, and a second insulating layer that are sequentially stacked. The first and second insulating layers may be formed of or may include, e.g., PP, PET, nylon, or the like, and the metal layer may be formed of or may include, e.g., aluminum, steel, stainless steel, or the like.

For example, the first and second sealing sheets 234 and 236 may be formed as a 3-layer structure in which the first insulating layer is formed of PP, the metal layer is formed of aluminum, and the second insulating layer is formed of PET. Both of the first insulating layers of the first and second sealing sheets 234 and 236 may be connected to the gasket 232. In an implementation, the first insulating layer may be attached to the gasket 232 by thermal bonding. In order to help improve a thermal bonding efficiency and adhesion strength between the first insulating layer and the gasket 232, the gasket 232 may be formed of a material in which a difference between a melting point of the material and that of the first insulating layer is 50° C. or less. In an implementation, the gasket 232 and the first insulating layer may be formed of the same material.

The gasket 232 may have a thickness that is about 80% to about 120% of a thickness of the electrode assembly 210. Maintaining the thickness of the gasket 232 at about 80% to about 120% of the thickness of the electrode assembly 210 may help ensure that a bent portion is not formed in the first and second sealing sheets 234 and 236. Accordingly, ripping or damage of the first and second sealing sheets 234 and 236 in other ways due to stress concentrated on the bent portion thereof when the flexible secondary battery 200 is bent may be prevented. Therefore, the stability of the flexible secondary battery 200 may be improved.

Hereinafter, a method of manufacturing the flexible secondary battery 200 will be briefly described.

First, the second sealing sheet 236 may be attached on the second surface of the gasket 232. In an implementation, the second sealing sheet 236 may be attached on the second surface of the gasket 232 by disposing or arranging the first insulating layer to face the gasket 232, and then thermally bonding the first insulating layer and the gasket 232.

Next, the electrode assembly 210 may be disposed inside the gasket 232. Then, the first sealing sheet 234 may be attached to the first surface of the gasket 232. The first sealing sheet 234 may be attached by using the same method as that for attaching the second sealing sheet 236.

A first electrode tab 213 (that is attached to a first uncoated area 212c) and a second electrode tab 215 (that is attached to a second uncoated area 214c) may be withdrawn toward the outside or may penetrate or pass through the sealing unit 230 by passing between the gasket 232 and the first sealing sheet 234 or between the gasket 232 and the second sealing sheet 236. An insulating film 219 may be attached to external sides of the first and second electrode tabs 213 and 215 that overlap with the gasket 232.

Although an example in which the second sealing sheet 236 is first attached to the gasket 232 and then the first sealing sheet 234 is attached has been described, in an implementation, the first sealing sheet 234 may be first attached to the gasket 232, e.g., prior to attaching of the second sealing sheet 236. In an implementation, the electrode assembly 210 may be disposed in the gasket 232, and then, the first and second sealing sheets 234 and 236 may be simultaneously or sequentially attached to the gasket 232.

Figure 4:
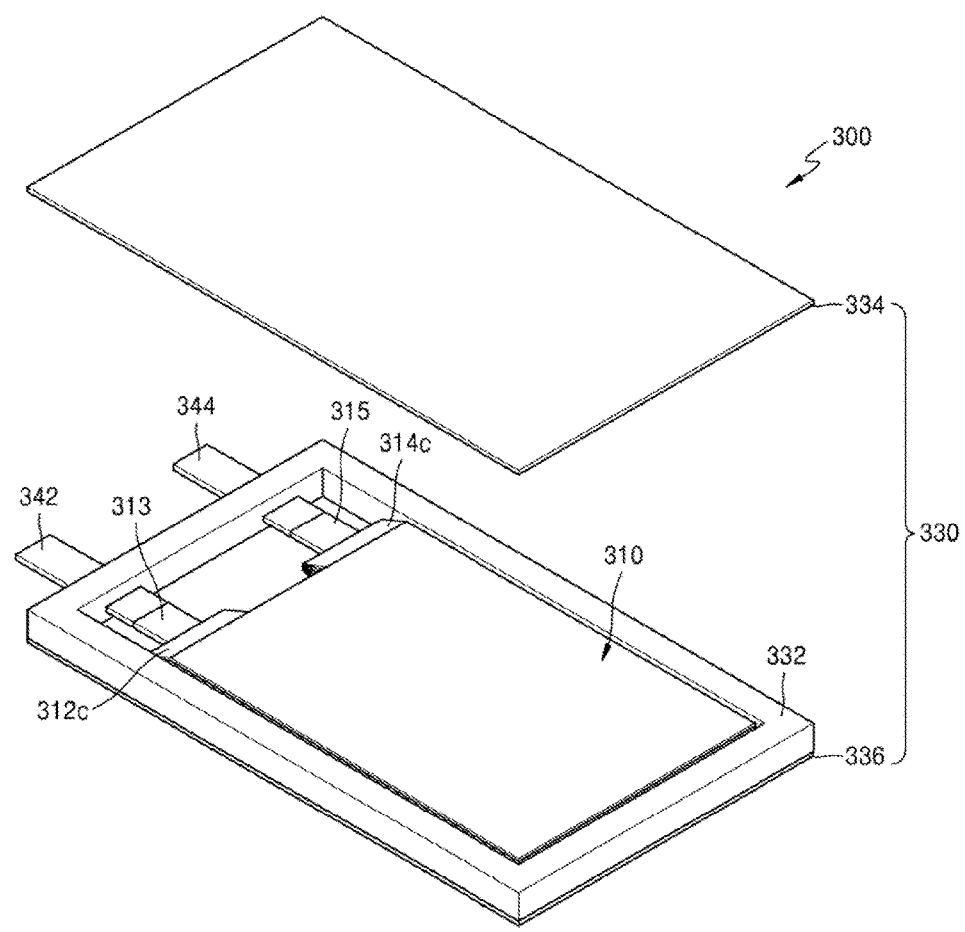
FIG. 4 illustrates an exploded perspective view of a flexible secondary battery according to another embodiment.
Figure 5:
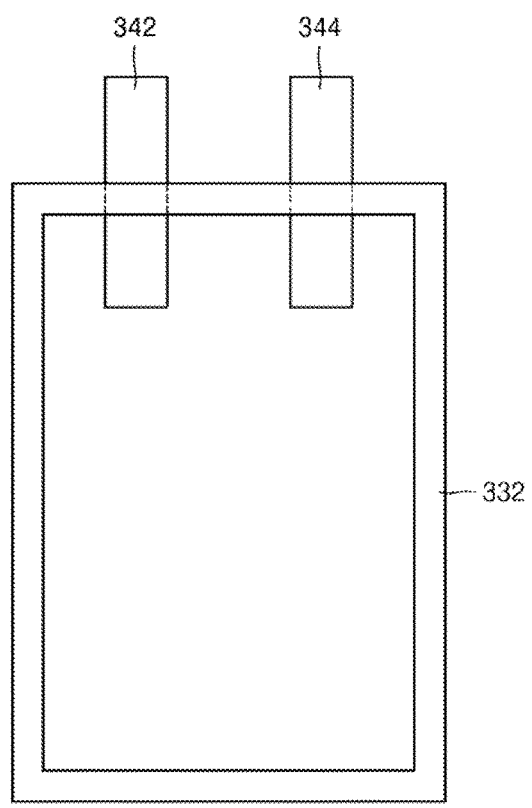
FIG. 5 illustrates a plan view of a gasket of the flexible secondary battery of FIG. 4.

FIG. 4 illustrates an exploded perspective view of a flexible secondary battery 300 according to another embodiment. FIG. 5 illustrates a plan view of a gasket 332 of the flexible secondary battery 300 of FIG. 4.

Referring to FIGS. 4 and 5, the flexible secondary battery 300 may include an electrode assembly 310 and a sealing unit 330 that seals the electrode assembly 310 therein. In an implementation, the sealing unit 330 may include the gasket 332 (that surrounds edges of the electrode assembly 310), a first sealing sheet 334 (attached to a first surface of the gasket 332), and a second sealing sheet 336 (attached to a second surface of the gasket 332).

The electrode assembly 310 is the same as the electrode assembly 110 illustrated in and described with reference to FIGS. 1 and 2, and repeated detailed description thereof may be omitted. Also, the first and second sealing sheets 334 and 336 are respectively the same as the first and second sealing sheets 234 and 236, and repeated detailed description thereof may be omitted.

A protection film (not shown) may be disposed on at least one of an upper surface or a lower surface (e.g., at least one outer surface) of the electrode assembly 310. In an implementation, the protection film may cover, e.g., completely cover, side or outer surfaces of the electrode assembly 310.

The protection film may include, e.g., polytetrafluoroethylene, thermoplastic polyimide, polyphthalamide, polyethersulfone, polyphenylene sulfide, polyetherimide, or polyetherether ketone. For example, a bending property of the flexible secondary battery 300 may be improved, and a separator may be prevented from shrinking due to heat applied when thermally bonding the sealing unit 330 to seal the electrode assembly 310.

The gasket 332 may surround edges of the electrode assembly 310 and may be formed of a flexible material. For example, the gasket 332 may bend together with the electrode assembly 310 when the flexible secondary battery 300 is bent. Thus, the gasket 332 may help prevent damage to the electrode assembly 310 by evenly distributing stress.

A first lead electrode 342 and a second lead electrode 344 may both penetrate through a side of the gasket 332. The first and second lead electrodes 342 and 344 may be integrally formed with or closely adhered to the gasket 332 by insertion or injection.

The first lead electrode 342 may contact a first electrode tab 313 in or at an inner area or interior of the gasket 332, and the second lead electrode 344 may contact a second electrode tab 315 in or at an inner area or interior of the gasket 332. The first electrode tab 313 may contact a first uncoated area 312c, and the second electrode tab 315 may contact a second uncoated area 314c.

As described above, when the first and second electrode tabs 313 and 315 are respectively connected to the first and second lead electrodes 342 and 344, the first and second electrode tabs 313 and 315 may be connected to the outside without bending, and thus, the first and second electrode tabs 313 and 315 may not be damaged.

A method of manufacturing the flexible secondary battery 300 may be quite the same as the method of manufacturing the flexible secondary battery 200 with reference to FIG. 3. In an implementation, when disposing the electrode assembly 310 in the gasket 332, the first and second electrode tabs 313 and 315 may be respectively attached to the first and second lead electrodes 342 and 344 by, e.g., welding.

By way of summation and review, as the market for various mobile electronic devices grows, demand for appropriate batteries for mobile electronic devices is also increasing. Increased demand for flexible devices with improved utility, mobility, storage, and resistance against external shocks may increase demand for flexible and stable batteries.

As described above, according to the one or more of the above embodiments, the stability and reliability of a flexible secondary battery may be maintained, even when the flexible secondary battery is repeatedly bent.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A flexible secondary battery, comprising:
an electrode assembly that includes a first electrode layer, a second electrode layer, and a separator between the first and second electrode layers;
a protection film on at least one of an upper surface or a lower surface of the electrode assembly;
a fixing unit, the fixing unit fixing one end portion of each of the first electrode layer, the separator, the second electrode layer, and the protection film; and
a sealing unit, the sealing unit sealing the electrode assembly and the protection film therein such that the protection film is between the electrode assembly and the sealing unit,
wherein a melting point of the protection film is higher than a melting point of the separator,
wherein the protection film includes at least one of polyphthalamide, polyethersulfone, polyphenylene sulfide, polyetherimide, or polyether ether ketone,
wherein the sealing unit includes a first sealing sheet and a second sealing sheet attached to each other and sealing the electrode assembly therein, and
wherein each of the first sealing sheet and the second sealing sheet include a first insulating layer, a metal layer, and a second insulating layer sequentially stacked.

2. The flexible secondary battery as claimed in claim 1, wherein the protection film includes a material having a melting point of about 150° C. or higher.

3. The flexible secondary battery as claimed in claim 1, wherein the protection film has a friction coefficient of 1.0 or less.

4. The flexible secondary battery as claimed in claim 1, wherein the protection film covers a side surface of the electrode assembly.

5. The flexible secondary battery as claimed in claim 1, further comprising a first electrode tab and a second electrode tab, wherein:
the first electrode layer includes:
a first metal current collector,
a first active material area formed by coating the first metal current collector with a first active material, and
a first uncoated area that is not coated with the first active material, the first electrode tab being attached to the first uncoated area, and
the second electrode layer includes:
a second metal current collector,
a second active material area formed by coating the second metal current collector with a second active material, and
a second uncoated area that is not coated with the second active material, the second electrode tab being attached to the second uncoated area.

6. The flexible secondary battery as claimed in claim 5, wherein the sealing unit includes:
a flexible gasket surrounding edges of the electrode assembly;
the first sealing sheet on a first surface of the flexible gasket; and
the second sealing sheet on a second surface of the flexible gasket, the second surface being opposite to the first surface.

7. The flexible secondary battery as claimed in claim 6, wherein a thickness of the flexible gasket is about 80% to about 120% of a thickness of the electrode assembly.

8. The flexible secondary battery as claimed in claim 6, wherein:
   each first insulating layer contacts the gasket, and
   the flexible gasket and each first insulating layer are formed of a same material.

9. The flexible secondary battery as claimed in claim 6, further comprising a first lead electrode and a second lead electrode that pass through one side of the flexible gasket.

10. The flexible secondary battery as claimed in claim 9, wherein:
    the first lead electrode contacts the first electrode tab in an interior of the flexible gasket, and
    the second lead electrode contacts the second electrode tab in the interior of the flexible gasket.

11. The flexible second battery as claimed in claim 5, wherein:
    the first sealing unit includes an accommodation hole, the accommodation hole accommodating the electrode assembly therein; and
    the second sealing unit covers the accommodation hole and that is attached to the first sealing unit at an edge of the accommodation hole,
    wherein the first and second electrode tabs extend from an inside of the sealing unit to an outside of the sealing unit by passing between the first and second sealing units.

* * * * *